No. 849,983. PATENTED APR. 9, 1907.
L. C. A. DENLEA.
CLOTHES LINE FASTENER.
APPLICATION FILED OCT. 31, 1906.

Inventor
Leo C. A. Denlea,
By Victor J. Evans
Attorney

Witnesses
J. L. Wright

UNITED STATES PATENT OFFICE.

LEO C. A. DENLEA, OF NEW YORK, N. Y.

CLOTHES-LINE FASTENER.

No. 849,983.        Specification of Letters Patent.        Patented April 9, 1907.

Application filed October 31, 1906. Serial No. 341,466.

*To all whom it may concern:*

Be it known that I, LEO C. A. DENLEA, a citizen of the United States of America, residing at New York, in the county of New York and State of New York, have invented new and useful Improvements in Clothes-Line Fasteners, of which the following is a specification.

This invention relates to rope-clamps, more particularly designed for use as a clothes-line fastener, but capable of other uses in fastening the meeting ends of ropes or lines.

One of the principal objects of the invention is to provide a device of simple construction which will permit the ready adjustment of the free end of a rope or clothes-line and which will firmly clamp the same in adjusted position.

Another object of the invention is to provide a rope-clamp or clothes-line fastener which will have a smooth outer surface and obviate the troublesome projections upon devices of this character as commonly used.

These and other objects may be attained by means of the construction illustrated in the accompanying drawings, in which—

Figure 1:
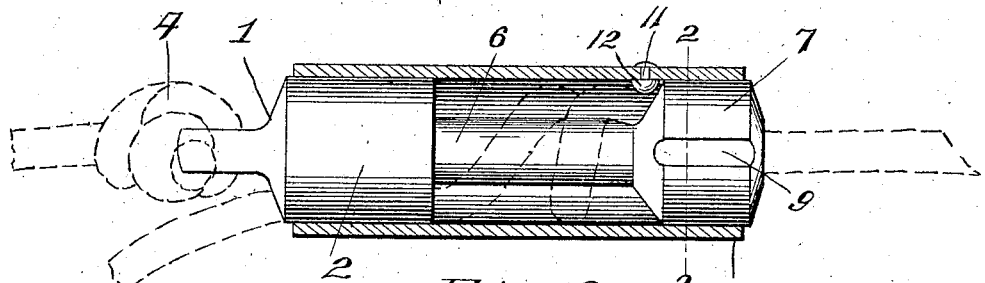
Figure 2:
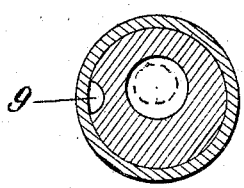
Figure 3:
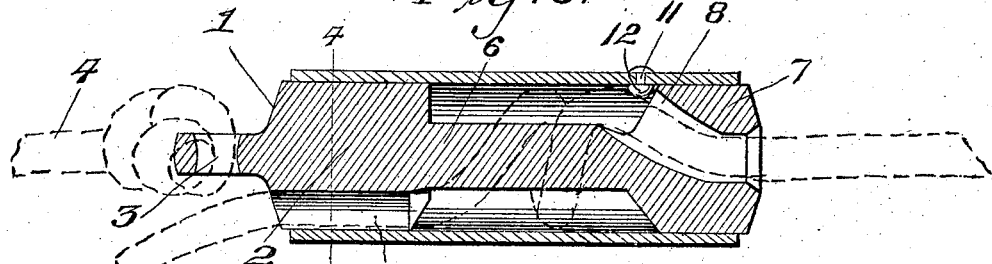
Figure 4:
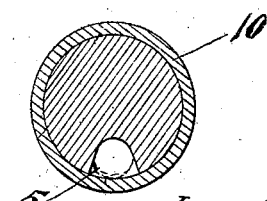

Figure 1 is a side view of a rope-clamp made in accordance with my invention, showing the sliding sleeve in section and a rope or line in dotted lines. Fig. 2 is a vertical sectional view on the line 2 2, Fig. 1. Fig. 3 is a longitudinal sectional view of the same. Fig. 4 is a vertical sectional view on the line 4 4, Fig. 3.

Referring to the drawings for a more particular description of my invention, the numeral 1 designates the inner member of the clamp provided with a head 2, of cylindrical formation, having an extended lug at one end provided with an opening 3, to which the end of a rope or line 4 is connected, as shown in dotted lines in Fig. 1. The head 2 is provided with a longitudinal groove 5, through which the free end of the rope passes. Extending from the head 2 is a shank or stem 6 of reduced diameter, and connected to the stem 6 is a plug or head 7, provided with an inclined bore 8, said bore extending from the outer end of the plug 7 inward and upward and terminating at the junction of the plug 7 and the stem 6, as shown more particularly in Fig. 3. A groove 9 extends longitudinally through the plug 7. A sleeve 10 of a diameter to fit loosely over the head 2 and the plug 7 is provided with a double-headed stop 11, the inner head 12 of which is of substantially the same contour as the groove 9 in the plug 7.

The operation of my invention may be briefly described as follows: The rope 4 having been connected at one end to the eye 3 on the head 2 and the sleeve 10 having been removed from the plug 7 by bringing the head 12 of the rivet 11 into coincidence with the groove 9, the free end of the rope is passed through the bore 8 in plug 7, and one or two turns of the rope are passed around the shank 6, and the free end of the rope or line is placed within the groove 5 in the head 2. The sleeve 10 is then slipped over the inner member of the clamp by bringing the head 12 of the stop 11 into coincidence with the groove 9. After the sleeve 10 has been slipped in place it is turned out of alinement with the groove 9, so that the head 12 lies against the inner surface or wall of the plug 7, as shown in Fig. 1. In this condition the rope is firmly clamped in the groove 5 and held against slipping, and in order to readjust the end of the rope the head 12 is again brought into coincidence with the groove 9, and the sleeve is slipped off the inner member, and the rope may then be readjusted.

From the foregoing it will be obvious that my rope-clamp is of simple construction, has no troublesome projections, obviates the use of springs or other devices which would become damaged or worn from use, and that the device as a whole may be manufactured at slight cost and is very efficient and reliable in use.

Having thus described the invention, what I claim is—

1. A rope-clamp comprising a clamping element having heads at opposite ends thereof and an intermediate connecting-stem of smaller diameter than the heads, there being openings in the heads to permit a rope to pass through the same and a sleeve fitted to the heads to slide over and cover the same and means for holding said sleeve in adjusted position.

2. In a device of the character described, a clamping element having heads at its opposite ends, means for connecting a rope to one of the heads, a shank extending from one head to the other, said heads provided with openings to admit a rope, one of said heads having a longitudinal groove and a sleeve mounted to slide upon said clamping element, said sleeve being provided with a headed stop conforming in shape to said groove, substantially as described.

3. A rope-clamp comprising a clamping element having oppositely-disposed heads connected by an intermediate shank or stem of reduced diameter, said heads being provided with means for permitting a rope to pass through the same, and a sliding sleeve for covering said clamping element and holding the free end of a rope, substantially as described.

In testimony whereof I affix my signature in presence of two witnesses.

LEO C. A. DENLEA.

Witnesses:
JOHN BERNHARD,
JAMES HELION.